United States Patent
Swaminathan et al.

(10) Patent No.: US 12,368,666 B2
(45) Date of Patent: Jul. 22, 2025

(54) EFFICIENT TRAFFIC REDIRECTION FOR AN MCLAG FOR CONTROLLED UNAVAILABILITY EVENTS

(71) Applicant: Hewlett Packard Enterprise Development LP, Houston, TX (US)

(72) Inventors: Venkatachalam Swaminathan, Bangalore (IN); Venkatavaradhan Devarajan, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/719,138

(22) Filed: Apr. 12, 2022

(65) Prior Publication Data

US 2023/0327981 A1     Oct. 12, 2023

(51) Int. Cl.
*H04L 45/24*     (2022.01)
*H04L 45/00*     (2022.01)
*H04L 45/12*     (2022.01)
*H04L 45/42*     (2022.01)

(52) U.S. Cl.
CPC .......... *H04L 45/245* (2013.01); *H04L 45/123* (2013.01); *H04L 45/22* (2013.01); *H04L 45/42* (2013.01)

(58) Field of Classification Search
CPC ....... H04L 45/28; H04L 45/22; H04L 45/245; H04L 69/40; H04L 47/41; H04L 41/0663; H04L 45/563; H04L 45/00; H04L 45/123; H04L 45/42; G06F 9/4416
See application file for complete search history.

(56) References Cited

U.S. PATENT DOCUMENTS

2014/0307540 A1* 10/2014 Duda .................... H04L 41/082
                                                       370/220
2015/0312121 A1* 10/2015 Yasuda ............... H04L 41/0686
                                                       370/243
2016/0313985 A1* 10/2016 Sprygada ................ G06F 8/654
(Continued)

OTHER PUBLICATIONS

Junos, " QFX Series MC-LAG Fabric Upgrade Procedure", 06/26/202 (Year: 2020).*

(Continued)

*Primary Examiner* — Messeret F Gebre
(74) *Attorney, Agent, or Firm* — Park, Vaughan, Fleming & Dowler LLP

(57) ABSTRACT

A system for facilitating traffic redirection for a multi-chassis link aggregation group (MCLAG) is provided. During operation, the system can participate in an MCLAG using a first interface of a first switch. The MCLAG can also include a second interface of a second switch. Based on predetermined unavailability for the first switch, the system can determine a sequence of applications for a plurality of traffic forwarding configurations. A respective configuration can facilitate loop prevention for traffic forwarded via the MCLAG. The system can then apply the plurality of configurations to the first switch based on the sequence of applications to redirect unicast traffic from the first switch to the second switch. Here, applying a respective configuration can include programming corresponding switch hardware with the configuration. Subsequently, the system can perform a set of operations on the first switch that triggers the predetermined unavailability.

18 Claims, 11 Drawing Sheets

(56) References Cited

U.S. PATENT DOCUMENTS

2020/0177438 A1\* 6/2020 Nandy ................ H04L 41/0836
2021/0051115 A1\* 2/2021 Annamary ............ H04L 45/245
2021/0218628 A1\* 7/2021 Kaliyamoorthy ....... G06F 16/27

OTHER PUBLICATIONS

"M-LAG configuration", Mar. 10, 2021 (Year: 2021).\*
"IEEE Draft Standard for Local and metropolitan area networks—Link Aggregation," in IEEE P802.1AX/D4.1, Jun. 2014 , vol., no., pp. 1-315, Jul. 25, 2014. (Year: 2014).\*
T. Limmer and F. Dressler, "Flow-based TCP connection analysis," 2009 IEEE 28th International Performance Computing and Communications Conference, Scottsdale, AZ, USA, 2009, pp. 376-383 (Year: 2009).\*
IEEE, "IEEE Standard for Local and Metropolitan Area Networks", Link Aggregation, IEEE Computer Society, LAN/MAN Standards Committee, IEEE Std 802.1AX™, 2020, 333 pages.

\* cited by examiner

EFFICIENT TRAFFIC REDIRECTION FOR AN MCLAG FOR CONTROLLED UNAVAILABILITY EVENTS

BACKGROUND

Field

The present disclosure relates to communication networks. More specifically, the present disclosure relates to a method and system for efficiently redirecting traffic for a multi-chassis link aggregation group (MCLAG) for controlled unavailability events.

BRIEF DESCRIPTION OF THE FIGURES

In the figures, like reference numerals refer to the same figure elements.

DETAILED DESCRIPTION

Figure 1A:
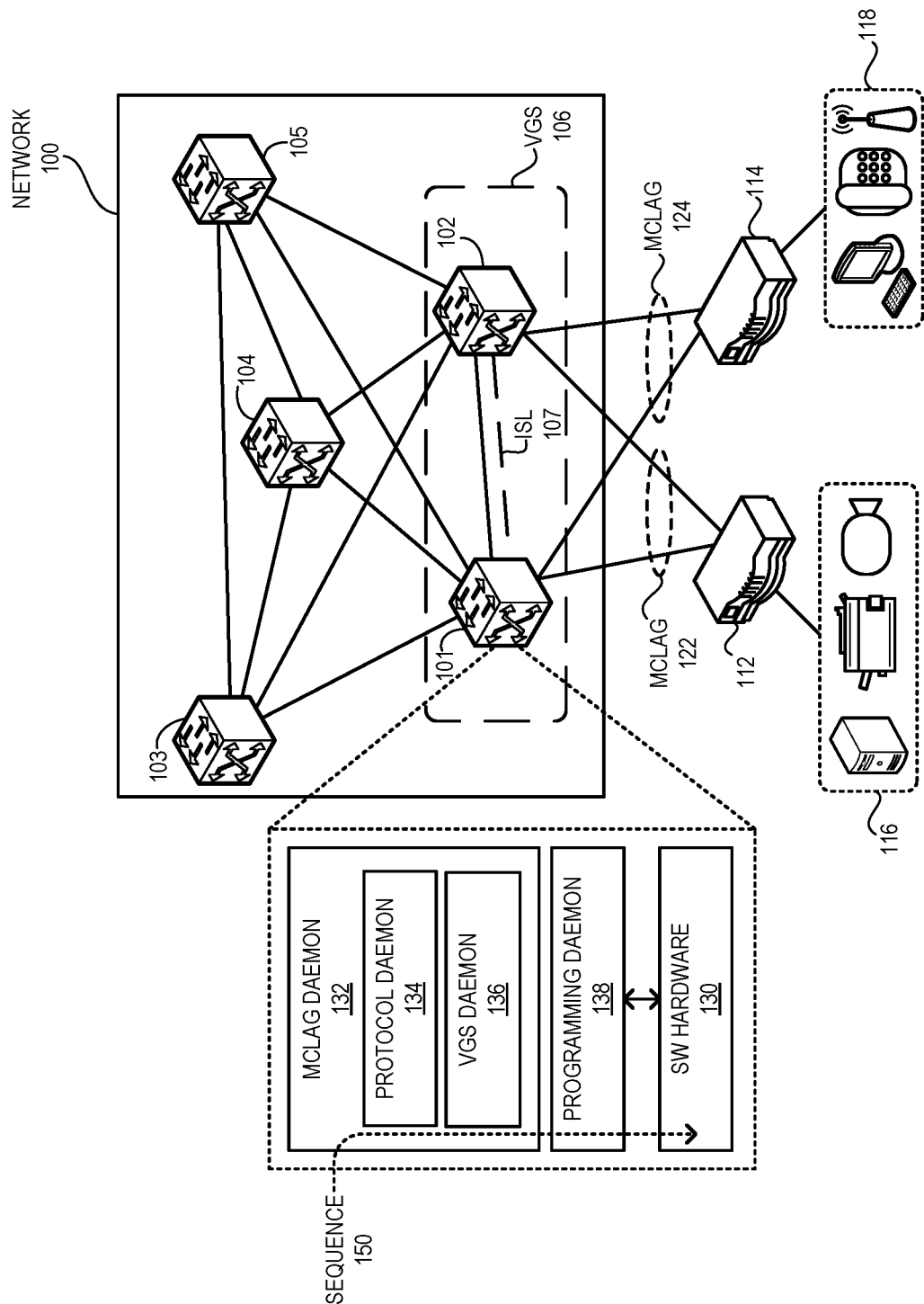
FIG. 1A illustrates an example of a network supporting efficient traffic redirection for MCLAGs for controlled unavailability events, in accordance with an aspect of the present application.

The following description is presented to enable any person skilled in the art to make and use the invention, and is provided in the context of a particular application and its requirements. Various modifications to the disclosed examples will be readily apparent to those skilled in the art, and the general principles defined herein may be applied to other examples and applications without departing from the spirit and scope of the present invention. Thus, the present invention is not limited to the examples shown, but is to be accorded the widest scope consistent with the claims.

The Internet can be the delivery medium for a variety of applications running on physical and virtual devices. Such applications have brought with them an increasing demand for bandwidth. As a result, equipment vendors race to build larger switches with significant transmission capabilities. To bolster the transmission capacity between two devices, multiple links between the devices can be aggregated together to form a link aggregation group (LAG). A user (e.g., a network administrator) may configure two or more ports on each of the devices to be combined together for the LAG. The combined ports can be represented as a virtual interface that has the sum of the individual ports' bandwidth.

A LAG can be further enhanced where a device can be coupled to a plurality of devices, and the links coupling the devices can be grouped together to operate as a single link. Such aggregated links distributed across multiple devices can be referred to as a multi-chassis link aggregation group (MCLAG). The plurality of devices participating in the MCLAG can be referred to as participating devices. Typically, a respective pair of participating devices can be coupled to each other with an inter-switch link (ISL). If one of the participating devices becomes unavailable, traffic can be redirected to another participating device over the ISL. The other participating device can then continue to forward traffic to and from the MCLAG. In this way, the participating devices of the MCLAG can facilitate high availability to each other.

One aspect of the present technology can provide a system for facilitating traffic redirection for an MCLAG. During operation, the system can participate in an MCLAG using a first interface of a first switch of a network. The MCLAG can also include a second interface of a second switch of the network. Based on a predetermined unavailability for the first switch, the system can determine a sequence of applications for a plurality of traffic forwarding configurations. A respective traffic forwarding configuration can facilitate loop prevention for traffic forwarded via the MCLAG. The system can then apply the plurality of traffic forwarding configurations to the first switch based on the sequence of applications to redirect unicast traffic from the first switch to the second switch. Here, applying a respective traffic forwarding configuration can include programming corresponding switch hardware with the traffic forwarding configuration. Subsequently, the system can perform a set of operations on the first switch that triggers the predetermined unavailability.

In a variation on this aspect, upon recovery from the predetermined unavailability, the system can determine a second sequence of applications for the plurality of traffic forwarding configurations. The system can then apply the plurality of traffic forwarding configurations to the first switch based on the second sequence of applications to restore unicast traffic for the MCLAG.

In a further variation, the second sequence of applications can be a reverse of the sequence of applications.

In a variation on this aspect, the MCLAG can be in a plurality of MCLAGs configured for the first and second switches. The system can then apply the plurality of traffic forwarding configurations to the first switch for a respective MCLAG of the plurality of MCLAGs.

In a further variation, the system can perform the set of operations on the first switch in response to applying the plurality of traffic forwarding configurations to the plurality of MCLAGs.

In a variation on this aspect, to configure the corresponding switch hardware with the traffic forwarding configuration, the system can receive an acknowledgment indicating that the traffic forwarding configuration is programmed at the corresponding switch hardware further comprises. The system can then proceed to the application of a subsequent traffic forwarding configuration in the sequence in response to receiving the acknowledgment.

In a variation on this aspect, the sequence of applications can also include an external traffic forwarding configuration applicable to the second switch. The system can then request the second switch to apply the external traffic forwarding configuration and receive an acknowledgment indicating that the external traffic forwarding configuration is programmed at the switch hardware of the second switch.

In a variation on this aspect, the sequence of applications can be based on inter-dependencies of the plurality of traffic forwarding configurations such that traffic redirection can be enabled prior to disabling a local instance of the MCLAG.

In a variation on this aspect, the plurality of traffic forwarding configurations can include blocking flooding of multi-destination traffic over the MCLAG, redirecting traffic destined to the MCLAG to the second switch, and disabling local communication for the MCLAG. The sequence of applications can also include an external traffic forwarding configuration allowing forwarding of the redirected traffic over the MCLAG.

In a variation on this aspect, the system can send a notification message to a third switch of the network. The notification message can indicate the unavailability of a link of the first switch in the MCLAG. In this way, the notification message can allow the third switch to withdraw from the link.

The examples described herein solve the problem of facilitating traffic redirection for an MCLAG with low temporal unavailability for a controlled event by (i) applying a set of configurations dictating traffic forwarding via the MCLAG in a step-locking sequence; and (ii) committing a respective configuration upon receiving acknowledgment from a corresponding piece of hardware. At a respective step of the sequence, a way of forwarding traffic for the MCLAG is supported by at least one of the participating devices before shutting down another way of forwarding traffic. In this way, traffic can be gracefully redirected from a participating device for a controlled unavailability event, such as a firmware update.

A change in a network may occur as a result of different events. These events can be categorized into two groups: controlled (or predetermined) events and uncontrolled events. For example, user-initiated events, such as reboot, firmware upgrade, and link toggle, can be referred to as controlled or predetermined events because the initiation of such events can be predetermined and controlled by the user. On the other hand, failure, accident, and disaster-related events, such as power failure, hardware failure, and human errors, can be referred to as uncontrolled events since the user may not control how these events are triggered. Regardless of the type, an event may affect one or more elements in the network and may impact the flow of data traffic in the network.

A participating device can apply one or more configurations to manage the flow of traffic for the MCLAG. For example, the device can apply a configuration to block layer-2 ISL traffic (i.e., traffic received over the ISL) from forwarding to the MCLAG. On the other hand, if the MCLAG is unavailable (e.g., the current state of the MCLAG is down) at the device, the device can apply a configuration to redirect traffic destined to the MCLAG to a remote participating device via the ISL. However, when the MCLAG becomes available at the device, the device may reconfigure to remove the traffic redirection over the ISL. Furthermore, the device can apply a configuration that can block the flooding of multi-destination traffic, such as broadcast, unknown unicast, and multicast (BUM) traffic, when the MCLAG is unavailable.

With existing technologies, the device may apply one or more configurations in response to an event regardless of its type. Even if the event is a controlled event, the device may apply the configurations to redirect traffic to a peer participating device without considering the impact of the application. Consequently, without coordinated application of the configurations, even with protocol-level graceful procedures, the device may remain unavailable for forwarding traffic for the MCLAG for a significant period and cause interruption of traffic. The issue can be further exacerbated because the application of the configurations can be managed by different daemons of a management application (e.g., an operating system) of the device. In particular, different daemons may perform the operations associated with the configuration at different times.

An MCLAG daemon, which can be responsible for managing an MCLAG, may process the configuration and notify a programming daemon to configure the hardware accordingly. However, the MCLAG daemon may not wait for the hardware configuration to complete. Under high load scenarios, the hardware may not complete the set of configuration requests from the programming daemon at the same rate as the MCLAG daemon. Hence, while the hardware is being programmed, the MCLAG daemon may process additional configurations and request the programming daemon for subsequent configurations. This may lead to queuing of requests and cause the daemons and hardware to be in unsynchronized states associated with different configurations. Since some of the configurations cannot coexist (e.g., traffic redirection and egress blocking), the MCLAG may incur further traffic loss due to the unsynchronized states.

Furthermore, the performance of the daemons may vary based on the load on the device. If the device participates in a plurality of MCLAGs with different traffic loads, the state change of an MCLAG may impact the hardware programming for another MCLAG. For example, if multiple MCLAGs become operational, the hardware enablement for the other MCLAG may wait during the hardware programming of the MCLAG based on the order in which the hardware receives the configuration requests. Moreover, the state changes for an MCLAG can indicate whether the MCLAG has become operational or unavailable. Other devices in the network may subscribe or withdraw, respectively, to the MCLAG based on the state change. However, all participating devices may not be ready to accept or withdraw traffic for the MCLAG. The unsynchronized states between the participating devices may lead to further traffic loss in the network.

To solve this problem, for a controlled (or predetermined) unavailability event, a participating device of the MCLAG can apply the configurations in an orchestrated sequence that dictates the daemons of the device to follow an order of execution that ensures graceful redirection of traffic. The orchestrated sequence can reduce the adverse impact, such as traffic loss due to unavailability, of the transition or redirection of traffic from the device to a peer participating device of the MCLAG. The state transitions of the daemons associated with the MCLAG can be sequenced in such a way that the links are ready to accept and forward traffic. The step-locking sequence can allow the devices of MCLAG to operate in different transition states and continue to forward traffic. At a respective step, a new avenue is opened for the traffic flow to continue over the MCLAG before transitioning away from (e.g., shutting down) another, thereby facilitating a "make before break model" of traffic redirection for the MCLAG.

When the MCLAG daemon requests for applying a configuration of the sequence to the hardware of the device, the daemon can wait for an acknowledgment from the hardware before proceeding to the next configuration of the sequence. As a result, the daemon and the hardware can operate in the same state. Furthermore, the redirection of traffic may also need configuration updates at a peer device. Such a configuration can be referred to as an external configuration.

Accordingly, the daemon can request the application of the configuration from a peer device. The corresponding MCLAG daemon of the peer device, which can be referred to as the peer daemon, can receive the request and configure the hardware of the peer device. When the hardware of the peer device is configured, the peer daemon can receive an acknowledgment from the local hardware and send the corresponding acknowledgment to the requesting daemon. The daemon can then proceed to the subsequent configuration of the sequence.

To initiate a controlled unavailability event at the device, traffic destined to the MCLAG (i.e., the traffic to be forwarded via the MCLAG) should be redirected via the ISL to the peer device. However, enabling traffic redirection would require disabling the egress blocking at the peer device, which may lead to a loop in the network. Hence, to avoid the formation of the loop via the MCLAG, the initial (or first) configuration of the sequence includes enabling flood blocking for the MCLAG. The flood blocking prevents multi-destination traffic from flooding the network. Consequently, during the application of the sequence, traffic forwarding may be limited to unicast traffic.

In other words, during the application of the subsequent configurations of the sequence, multi-destination traffic forwarding may remain restricted. Upon blocking the flooding of multi-destination traffic, the device can initiate traffic redirection over the ISL without causing loops. Hence, the device can notify the peer device to disable the egress blocking for the MCLAG. Here, the MCLAG can remain in this state until the device receives an acknowledgment from the peer device. In other words, until the acknowledgment is received, the state may remain locked.

The peer device can then configure its local interfaces of the MCLAG to allow traffic received from the ISL to be forwarded to the MCLAG. The peer device can notify the device regarding the configuration. Subsequently, the device can configure the interface associated with the ISL to redirect traffic to the peer device. Accordingly, traffic to the MCLAG can be redirected via the ISL. When the redirection is complete, the device may use a link aggregation protocol, such as Link Aggregation Control Protocol (LACP), to notify other devices of the network to withdraw traffic for the MCLAG links associated with the device. Hence, the participating devices can apply graceful traffic redirection in a vendor-independent way.

In this disclosure, the term "switch" is used in a generic sense, and it can refer to any standalone or fabric switch operating in any network layer. "Switch" should not be interpreted as limiting examples of the present invention to layer-2 networks. Any device that can forward traffic to an external device or another switch can be referred to as a "switch." Any physical or virtual device (e.g., a virtual machine or switch operating on a computing device) that can forward traffic to an end device can be referred to as a "switch." Examples of a "switch" include, but are not limited to, a layer-2 switch, a layer-3 router, a routing switch, a component of a Gen-Z or Compute Express Link (CXL) network, a processor device, or a fabric switch comprising a plurality of similar or heterogeneous smaller physical and/or virtual switches.

A phrase indicating a device, such as "node," "machine," "entity," or "device" may indicate a switch and an end host, such as a user device. The term "message" refers to a group of bits that can be transported together across a network. "Message" should not be interpreted as limiting examples of the present examples to a particular layer of a network. "Message" can be replaced by other terminologies referring to a group of bits, such as "information," "data," "request," "response," "packet," "frame," "cell," "datagram," or "transaction." Furthermore, the term "port" can refer to the port that can receive, store, or transmit data. "Port" can also refer to the hardware, software, and/or firmware logic that can facilitate the operations of that port.

FIG. 1A illustrates an example of a network supporting efficient traffic redirection for MCLAGs for controlled unavailability events, in accordance with an aspect of the present application. A network 100 can include a plurality of devices, such as switches and end devices. Network 100 can include switches 101, 102, 103, 104, and 105. In some examples, network 100 can be an Ethernet, InfiniBand, PCIe, Gen-Z, CXL, or other networks, and may use a corresponding communication protocol, such as Internet Protocol (IP), FibreChannel over Ethernet (FCoE), or other protocol.

One or more links in network 100 can be tunnels. Examples of a tunnel can include, but are not limited to, VXLAN, Generic Routing Encapsulation (GRE), Network Virtualization using GRE (NVGRE), Generic Networking Virtualization Encapsulation (Geneve), Internet Protocol Security (IPsec). A VPN, such as an EVPN, can be deployed over network 100. Network 100 can include a virtual gateway switch (VGS) 106 that can couple network 100 to external network and devices. Here, switches 101 and 102 can operate as a single switch in conjunction with each other to facilitate VGS 106. VGS 106 can be associated with one or more virtual addresses (e.g., a virtual IP address and/or a virtual MAC address).

A respective link or tunnel formed at VGS 106 can use the virtual address to form the link or tunnel endpoint. As a result, switches 103, 104, and 105 of network 100 can consider VGS 106 as the other link or tunnel endpoint for a tunnel instead of switches 101 and 102. To forward traffic toward VGS 106, a switch in network 100, such as switch 105, can perform a load balancing operation and select one of switches 101 and 102 as the destination. VGS 106 can be coupled to devices 112 and 114 via MCLAGs 122 and 124, respectively.

Devices 112 and 114 can be coupled to respective sets of end devices 116 and 118, respectively. Examples of such a device can include, but are not limited to, a desktop or laptop computer, a server-grade computer, an appliance, a service-facilitating device (e.g., a cell tower or an access point), a virtual machine (VM), an application, a container, a cellular device, a tablet, a wearable device, a stationary or portable gaming console, a projection device, a network device (e.g., a switch), an attachable dongle, an augmented or virtual reality device, and a vehicular device.

Links coupling device 112 to switches 101 and 102 can form MCLAG 122. Hence, switches 101 and 102 can be referred to as the participating switches for MCLAG 122. Similarly, switches 101 and 102 can be referred to as the participating switches for MCLAG 124. Accordingly, switches 101 and 102 can be peer participating switches for MCLAGs 122 and 124. Switches 101 and 102 can maintain an ISL 107 between them for sharing multicast control and/or data packets. Switch 101 and 102 can exchange control messages for synchronizing states of MCLAGs 122 and 124 via ISL 107.

During operation, a change may occur at one of the participating switches, such as switch 101. The change may occur due to a controlled event or an uncontrolled event. For example, the user may initiate a controlled event (e.g., reboot, firmware upgrade, or link toggle) for switch 101. On the other hand, switch 101 may also incur an uncontrolled event (e.g., a failure, accident, or disaster). Regardless of the type, the event may affect switch 101 and may impact the flow of data traffic via MCLAGs 122 and 124. With existing technologies, switch 101 may apply one or more configurations in response to the event regardless of its type. However, even if the event is controlled (or predetermined), switch 101 may apply the configurations to redirect traffic to switch 102 without considering the impact of the application of the configurations.

Consequently, without coordinated application of the configurations at switch 101, even with protocol-level graceful procedures, switch 101 may remain unavailable for forwarding traffic for a respective MCLAG for a significant period and cause interruption of traffic. The issue can be further exacerbated because the application of the configurations can be managed by different daemons of a management application (e.g., an operating system) of switch 101. In particular, different daemons, such as a protocol daemon 134 and a programming daemon 138 may perform the operations associated with the configuration at different times.

Protocol daemon 134 can be responsible for managing the protocol associated with MCLAGs 122 and 124, such as LACP, may process a configuration based on the current status of an MCLAG, such as MCLAG 122. Protocol daemon 134 can then notify programming daemon 138 to configure hardware 130 of switch 101 accordingly. However, protocol daemon 134 may not wait for the configuration at hardware 130 to complete. Under high load scenarios, hardware 130 may not complete the set of configuration requests from programming daemon 138 at the same rate as that of protocol daemon 134. Hence, while hardware 130 is being programmed, protocol daemon 134 may process additional configurations and request programming daemon 138 for subsequent configurations.

The uneven pace of configuration of protocol domain 134 and hardware 130 may lead to queuing of requests and cause the daemons and hardware 130 in unsynchronized states associated with different configurations. Since some of the configurations cannot coexist (e.g., traffic redirection over 107 and egress blocking over MCLAG 122), MCLAG 122 may incur further traffic loss due to the unsynchronized states. Furthermore, the performance of daemons 134 and 138 may vary based on the load on switch 101. If loads on MCLAGs 122 and 124 are different, the state change of MCLAG 122 may impact the hardware programming for another MCLAG 124. For example, when MCLAGs 122 and 124 become operational, the hardware enablement for MCLAG 124 may wait during the hardware programming of MCLAG 122 based on the order in which hardware 130 receives the configuration requests from programming daemon 138.

Moreover, the state changes for MCLAG 122 can indicate whether MCLAG 122 has become operational or unavailable. Other devices in network 100, such as switch 105, may subscribe or withdraw, respectively, to MCLAG 122 based on the state change. When switch 105 can subscribe to MCLAG 122, switch 105 may maintain multiple paths to participating switches 101 and 102 (e.g., equal-cost multiple paths (ECMP)). Based on a load balancing policy, switch 105 may send traffic to MCLAG 122 (e.g., to device 112) via both switches 101 and 102. However, both switches 101 and 102 may not be ready to accept traffic for MCLAG 122 at that time. The unsynchronized states between switches 101 and 102 may lead to further traffic loss in network 100.

To solve this problem, for a controlled (or predetermined) unavailability event for switch 101, switch 101 can apply the configurations in an orchestrated step-locking sequence 150 that dictates the daemons switch 101 to follow an order of execution that ensures graceful redirection of traffic to switch 102. To apply sequence 150 of configurations, switch 101 can run an MCLAG daemon 132. MCLAG daemon 132 can be facilitated by protocol daemon 134 and a VGS daemon 136. VGS daemon 136 can provide the operations for configuring and maintaining VGS 106. MCLAG daemon 132 can utilize VGS daemon 136 to synchronize operations with switch 102. In particular, if any configuration of sequence 150 requires application at switch 101, VGS daemon 136 can facilitate synchronization of the application of the configuration at switch 102.

Orchestrated sequence 150 can reduce the adverse impact, such as traffic loss due to unavailability, of the transition of traffic from switch 101 to switch 102. In sequence 150, the state transitions of MCLAG daemon 132 can be sequenced in such a way that the links of MCLAG 122 can be ready to accept and forward traffic during and after the transition. The step-locking nature of sequence 150 can allow switches 101 and 102 to operate in different transition states and continue to forward traffic. At a respective step, a new avenue is opened for the traffic flow to continue over MCLAG 122 before transitioning away from (e.g., shutting down) another, thereby facilitating a "make before break model" of traffic redirection for MCLAG 122. MCLAG daemon 132 can apply the same orchestrated sequence 150 of configurations to MCLAG 124 for the controlled unavailability.

When the MCLAG daemon 132 requests programming daemon 138 for applying a configuration to hardware 130, MCLAG daemon 132 can wait for an acknowledgment from hardware 130 via programming daemon 138 before proceeding to the next configuration of sequence 150. As a result, MCLAG daemon 132 and hardware 130 can operate in the same state. Furthermore, the redirection of traffic may also need configuration updates at switch 102. Accordingly, MCLAG daemon 132 can request the application of the configuration from switch 102. When the hardware of switch 102 is configured, MCLAG daemon 132 can receive an acknowledgment from switch 102. MCLAG daemon 132 can then proceed to the subsequent configuration of sequence 150. In this way, upon determining the initiation of the controlled unavailability of switch 101, MCLAG daemon 132 can facilitate efficient traffic redirection from switch 101 to switch 102 for MCLAGs 122 and 124.

Figure 1B:
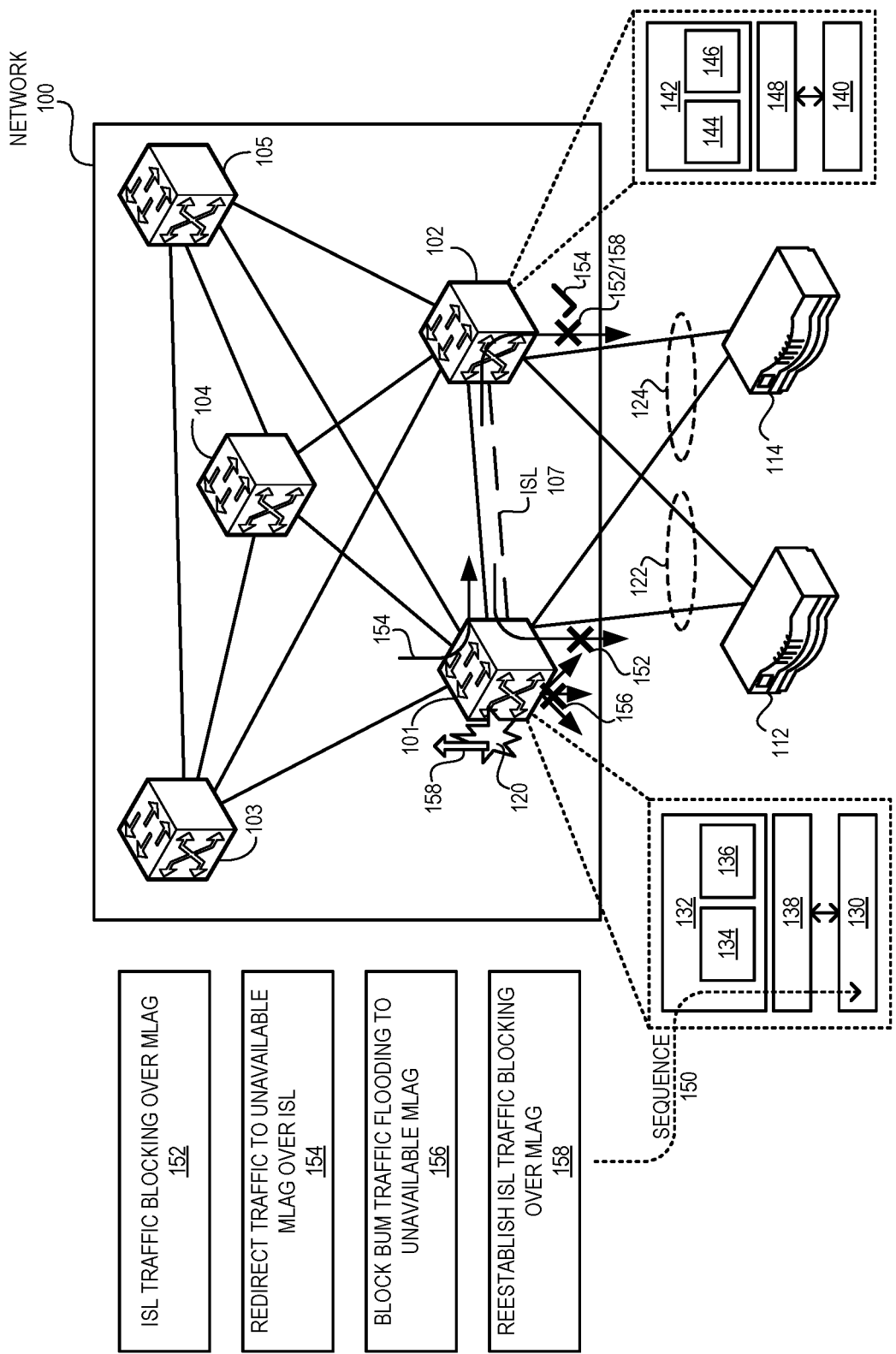
FIG. 1B illustrates an example of a set of configurations facilitating efficient traffic redirection for MCLAGs for controlled unavailability events, in accordance with an aspect of the present application.

FIG. 1B illustrates an example of a set of configurations facilitating efficient traffic redirection for MCLAGs for controlled unavailability events, in accordance with an aspect of the present application. Switch 101 can apply one or more configurations to manage the flow of traffic for MCLAG 122 (and MCLAG 124). For example, switch 101 can apply a configuration to establish ISL traffic (i.e., traffic received over the ISL) blocking over MCLAG 122 (configuration 152). On the other hand, if the MCLAG 122 is unavailable at switch 101 due to an event 120, switch 101 can apply a configuration to redirect traffic destined to MCLAG 122 to switch 102 via ISL 107 (configuration 154). However, switch 102 may also apply configure 152 to block the forwarding of ISL traffic to MCLAG 122. Furthermore, switch 101 can apply a configuration that can block the flooding of multi-destination traffic, such as BUM traffic, when MCLAG 122 is unavailable due to event 120 (configuration 156). On the other hand, when MCLAG 122 becomes available at switch 101, switch 101 may apply a configuration to reestablish the ISL traffic blocking over MCLAG 122 (configuration 158).

Suppose that event 120 is a controlled unavailability event at switch 101. Since the occurrence of such an event can be controlled by the user, switch 101 does not need to redirect traffic to switch 102. Instead, MCLAG daemon 132 can gradually redirect traffic by following sequence 150. Here, MCLAG daemon 132 may apply sequence 150 of configurations to MCLAGs 122 and 124 serially or in parallel. Prior to the controlled unavailability event for switch 101, traffic to MCLAG 122 (and MCLAG 124) should be redirected via ISL 107 to switch 102. However, enabling traffic redirection would require disabling the egress block at switch 102. Allowing forwarding of ISL traffic over MCLAG 122 may lead to a loop in network 100.

Hence, to avoid a loop generated via MCLAG 122, the initial (or first) configuration of sequence 150 includes enabling flood blocking for MCLAG 122 (configuration 156). The flood blocking prevents multi-destination traffic flooding in network 100. Consequently, during the application of sequence 150, traffic forwarding may be limited to unicast traffic. In other words, during the application of the subsequent configurations of sequence 150, multi-destination traffic forwarding may remain restricted. Upon blocking the flooding of multi-destination traffic, switch 101 can initiate traffic redirection over ISL 107 without causing loops. Hence, MCLAG daemon 132 can notify the corresponding MCLAG daemon 142 of switch 102 to disable the egress blocking for MCLAG 122 (configuration 152). Here, MCLAG 122 can remain at this state until switch 101 receives an acknowledgment from switch 102. In other words, until the acknowledgment is received, the state of MCLAG 122 may remain locked. VGS daemon 146 of MCLAG daemon 142 can receive the request.

Protocol daemon 144 can then issue a corresponding request to programming daemon 148 to configure hardware 140 of switch 102. MCLAG daemon 142 can then configure the local interfaces of MCLAG 122 to disable the egress blocking of ISL traffic received from switch 101. This can allow traffic received from ISL 107 to be forwarded to MCLAG 122. When hardware 140 is configured (configuration 152), programming daemon 148 can receive an acknowledgment from hardware 140. VGS daemon 146 can then send the corresponding acknowledgment to VGS daemon 136. Based on the acknowledgment, MCLAG daemon 132 can proceed to the subsequent configuration of sequence 150. MCLAG daemon 132 can configure the interface associated with ISL 107 to redirect traffic to switch 102 (configuration 154).

When the redirection is complete, protocol daemon 134 may notify other devices of network 100 to withdraw traffic for MCLAG 122 links associated with switch 101. For example, protocol daemon 134 can set the synchronization bit as "false" in an LACP notification message and send it to switches 103, 104, and 105. Upon receiving the notification message, switches 103, 104, and 105 may consider that switch 101 is out-of-synchronization. Accordingly, switches 103, 104, and 105 can remove the links of switch 101 in MCLAG 122 from the load balancing operation and forward traffic to the links of switch 102 in MCLAG 122. At this point, both ingress and egress traffic to switch 101 is stopped. Since the traffic is redirected to switch 102, the controlled unavailability event can be initiated for switch 101 without significant traffic impact by VGS daemon 136.

Figure 2A:
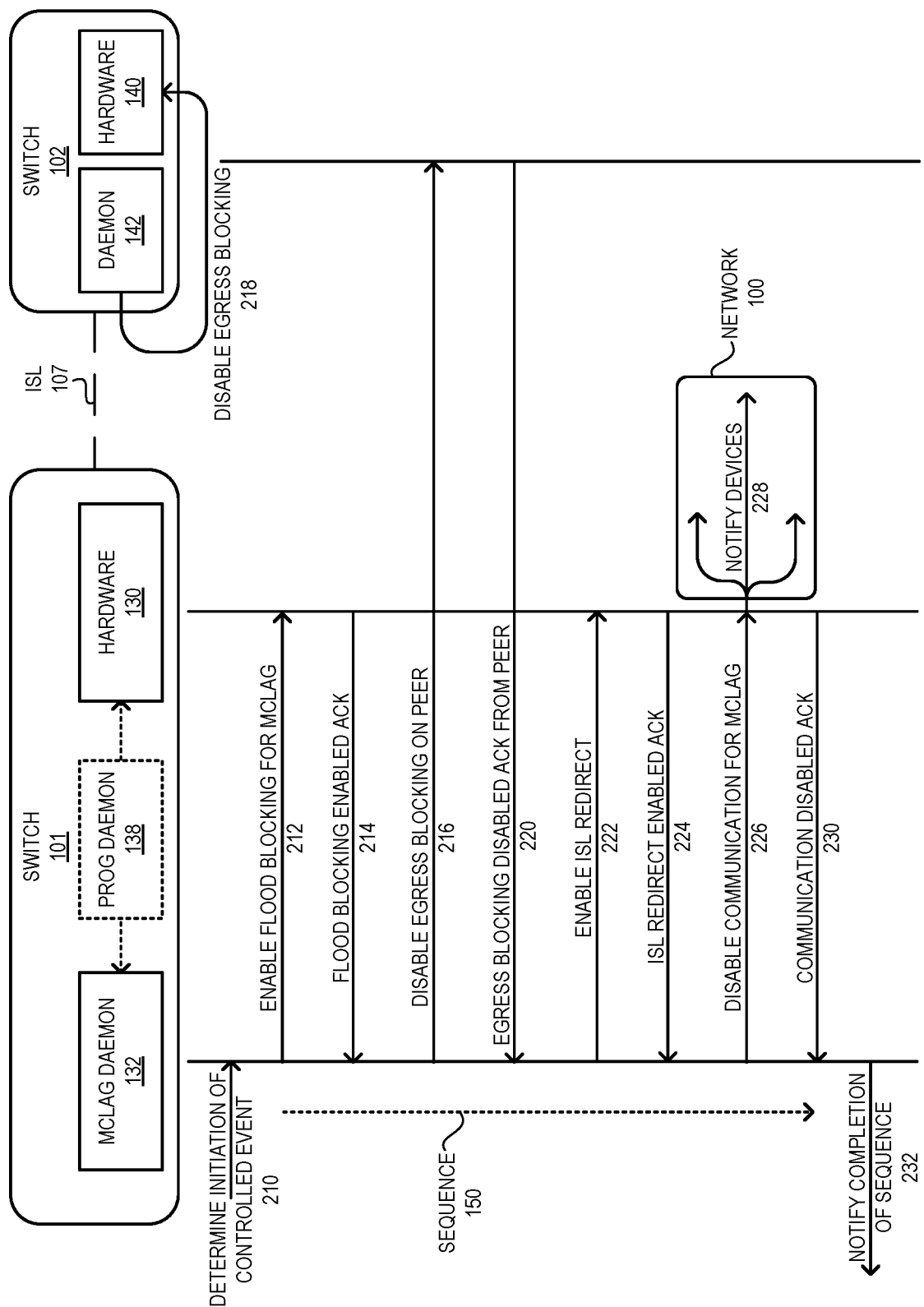
FIG. 2A illustrates an example of sequential configurations that efficiently redirects traffic for an MCLAG for controlled unavailability of a participating device of the MCLAG, in accordance with an aspect of the present application.

FIG. 2A illustrates an example of sequential configurations that efficiently redirects traffic for an MCLAG for controlled unavailability of a participating device of the MCLAG, in accordance with an aspect of the present application. During operation, MCLAG daemon 132 of switch 101 may determine the initiation of a controlled unavailability event (operation 210). MCLAG daemon 132 may receive a notification (e.g., an inter-process call or IPC) from the management application and determine the initiation of the controlled event. MCLAG daemon 132 can then initiate sequence 150 of configurations for a respective MCLAG associated with switch 101. The management application may wait for the completion of sequence 150 to execute the controlled unavailability event (e.g., reboot switch 101).

Accordingly, MCLAG daemon 132 can enable flood blocking for multi-destination traffic for the MCLAG (operation 212). MCLAG daemon 132 can send a request to programming daemon 138 to program the configuration in hardware 130 of switch 101. MCLAG daemon 132 can then wait for an acknowledgment from hardware 130, thereby ensuring that MCLAG daemon 132 and hardware 130 is operating on the same state of the MCLAG. When hardware 130 is programmed with the configuration, programming daemon 138 can forward an acknowledgment indicating that flood blocking is enabled (operation 214).

MCLAG daemon 132 can then issue a request to disable egress blocking for ISL traffic on the peer device, which is switch 102 (operation 216). Such a configuration can be referred to as an external configuration for switch 101. MCLAG daemon 142 of switch 102 can receive the request and disable the egress blocking in hardware 140 of switch 102 (operation 218). By disabling the egress blocking, switch 102 can allow the forwarding of ISL traffic received from switch 101 via the MCLAG. MCLAG daemon 142 can then forward an acknowledgment to MCLAG daemon 132 indicating that hardware 140 of switch 102 has disabled the egress blocking (operation 220). MCLAG daemon 132 can remain locked in the state until switch 102 disables the egress blocking.

Subsequently, MCLAG daemon 132 can enable ISL redirect, which redirects traffic destined to the MCLAG to switch 102 via ISL 107 (operation 222). When hardware 130 is programmed with the configuration, programming daemon 138 can forward an acknowledgment indicating that ISL redirect is enabled (operation 224). MCLAG daemon 132 can then disable communication for the MCLAG (e.g., disable LACP) (operation 226). The disablement of communication can stop both ingress and egress traffic to the MCLAG. To do so, MCLAG daemon 132 can send a notification (e.g., an LACP message) to other devices of network 100 that subscribe to the MCLAG (operation 228). The subscriber devices may be aware of the MCLAG and can perform load balancing between switches 101 and 102 for forwarding traffic to the MCLAG.

Upon receiving the notification message, the subscriber devices can withdraw the subscription to the links that originate from switch 101 and are in the MCLAG. The withdrawal can cause the subscriber devices to remove these links from the load balancing process. Accordingly, the subscriber devices can stop forwarding traffic to switch 101. When hardware 130 is programmed with the configuration, MCLAG daemon 132 can receive an acknowledgment indicating that communication is disabled for the MCLAG (operation 230). MCLAG daemon 132 can then notify the management application regarding the completion of sequence 150 (e.g., using an IPC) (operation 232).

Figure 2B:
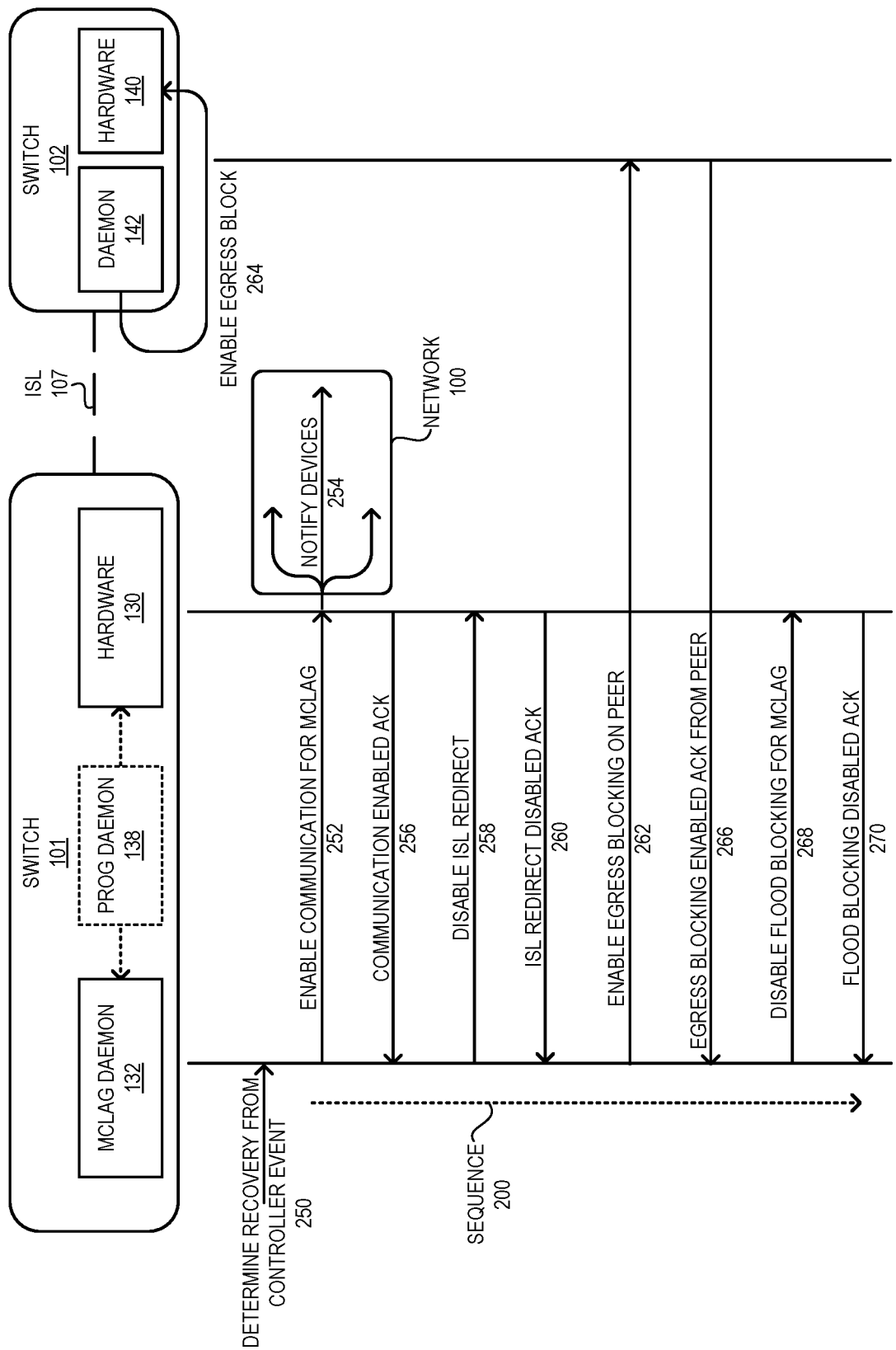
FIG. 2B illustrates an example of sequential configurations that efficiently reestablish traffic for an MCLAG for the recovery from a controlled event of a participating device of the MCLAG, in accordance with an aspect of the present application.

FIG. 2B illustrates an example of sequential configurations that efficiently reestablish traffic for an MCLAG for the recovery from a controlled event of a participating device of the MCLAG, in accordance with an aspect of the present application. During operation, MCLAG daemon 132 of switch 101 may determine the recovery from a controlled unavailability event (operation 250). MCLAG daemon 132 may receive a notification (e.g., an IPC) from the management application and determine the recovery from the controlled event. MCLAG daemon 132 can then initiate a sequence 200 of configurations for a respective MCLAG associated with switch 101. Sequence 200 can include a sequence of configurations that gracefully restores traffic to the MCLAG from switch 102. Accordingly, MCLAG daemon 132 can enable communication for the MCLAG (operation 252).

The enablement of communication can restart the flow of ingress and egress traffic to the MCLAG. To do so, MCLAG daemon 132 can send a notification (e.g., an LACP message) to other devices of network 100 that subscribe to the MCLAG (operation 254). Upon receiving the notification message, the subscriber devices can reestablish the subscription to the links that originate from switch 101 and are in the MCLAG. The reestablishment of the subscription can cause the subscriber devices to reincorporate these links into the load balancing process. Accordingly, the subscriber devices can restart forwarding traffic to switch 101. When hardware 130 is programmed with the configuration, MCLAG daemon 132 can receive an acknowledgment indicating that communication is enabled for the MCLAG (operation 256).

MCLAG daemon 132 can then disable ISL redirect, which blocks traffic destined to the MCLAG from being forwarded to switch 102 over ISL 107 (operation 258). When hardware 130 is programmed with the configuration, programming daemon 138 can forward an acknowledgment indicating that ISL redirect is disabled (operation 260). MCLAG daemon 132 can then issue a request to enable egress blocking for ISL traffic on the peer device, which is switch 102 (operation 262). MCLAG daemon 142 of switch 102 can receive the request and enable the egress blocking in hardware 140 of switch 102 (operation 264). By enabling the egress blocking, switch 102 can block the forwarding of ISL traffic received from switch 101 via the MCLAG.

MCLAG daemon 142 can then forward an acknowledgment to MCLAG daemon 132 indicating that hardware 140 of switch 102 has enabled the egress blocking (operation 266). Subsequently, MCLAG daemon 132 can disable flood blocking for multi-destination traffic for the MCLAG (operation 268). The disablement of the flood blocking can allow the forwarding of multi-destination traffic via the MCLAG. When hardware 130 is programmed with the configuration, programming daemon 138 can forward an acknowledgment indicating that flood blocking is disabled (operation 270). When sequence 200 is complete, the traffic to the links of switch 101 can be restored. Hence, upon recovery from the controlled event (e.g., switch 101 has been rebooted), traffic can be gracefully transitioned back to switch 101, thereby mitigating the adverse impact of the controlled event.

Figure 3:
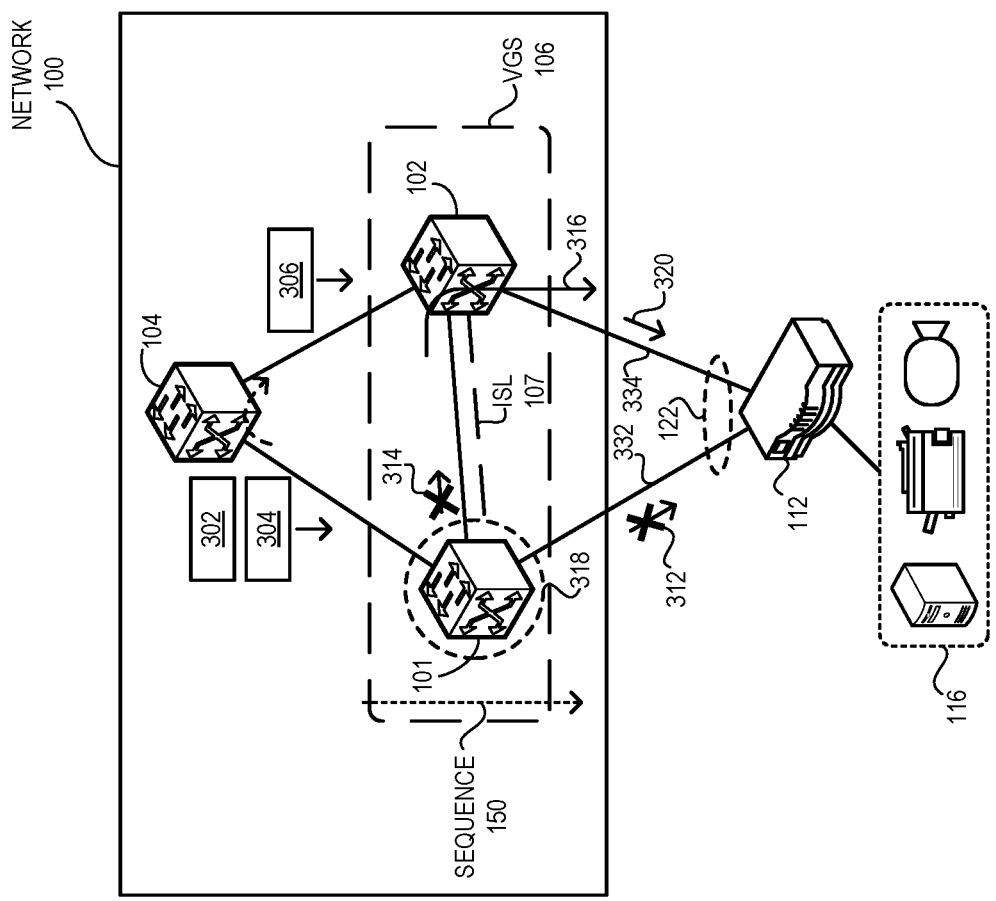
FIG. 3 illustrates an example of traffic forwarding for an MCLAG during the sequential configurations for controlled unavailability of a participating device of the MCLAG, in accordance with an aspect of the present application.

FIG. 3 illustrates an example of traffic forwarding for an MCLAG during the sequential configurations for controlled unavailability of a participating device of the MCLAG, in accordance with an aspect of the present application. When switch 101 applies sequence 150 of configurations, switch 101 may receive packets at different steps and perform a corresponding traffic forwarding operation. For example, when flood blocking for multi-destination traffic is enabled at switch 101 for MCLAG 122, switch 101 can receive a multi-destination packet 302 from switch 104. Due to the flood blocking, switch 101 can refrain from forwarding packet 302 over MCLAG 122 and may drop packet 302 (operation 312).

Furthermore, switch 101 can receive a unicast packet 304 when switch 102 has disabled egress blocking for ISL traffic but switch 101 has not enabled ISL redirection. Under such circumstances, switch 101 may drop packet 304 (operation 316). On the other hand, if switch 101 receives packet 304 when ISL redirection is configured, switch 101 can forward packet 304 to switch 102. Since egress blocking is disabled at switch 102 for MCLAG 122, switch 102 can forward packet 304 via its local link 334 of MCLAG 122 (operation 316). Hence, the redirection of traffic can be limited to unicast traffic.

When communication is disabled for MCLAG 122 at switch 101 (operation 318), other subscriber devices, such as switch 104, can receive a corresponding notification and withdraw the subscription of link 332 of MCLAG 122. Hence, switch 104 can start sending all packets for MCLAG 122 to switch 102. Subsequently, switch 104 can send a packet 306 to switch 102. Moreover, since ISL redirection is active, even if switch 104 sends packet 306 to switch 101, packet 306 can be forwarded over ISL 107 to switch 102. Upon receiving packet 306, switch 102 can forward packet 304 via MCLAG 122 (operation 320).

Figure 4A:
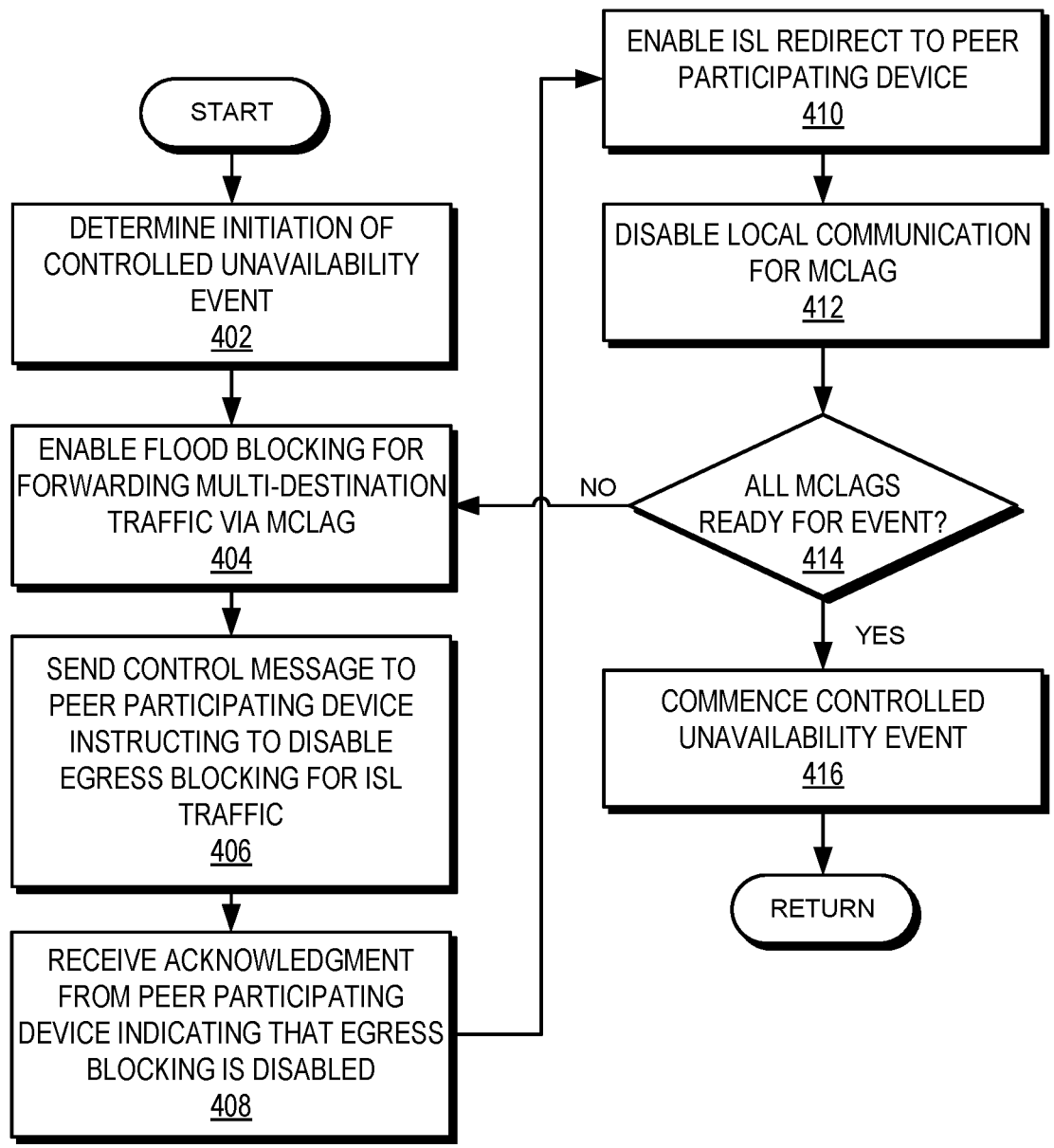
FIG. 4A presents a flowchart illustrating the process of a participating device of an MCLAG applying sequential configurations that efficiently redirects traffic from the device, in accordance with an aspect of the present application.

FIG. 4A presents a flowchart illustrating the process of a participating device of an MCLAG applying sequential configurations that efficiently redirects traffic from the device, in accordance with an aspect of the present application. The operations of this process can be performed by one or more daemons and the forwarding hardware of the device. During operation, the device can determine the initiation of a controlled unavailability event (operation 402). The device can then enable flood blocking for the forwarding multi-destination traffic via the MCLAG (operation 404). The device can then send a control message to a peer participating device instructing to disable egress blocking for ISL traffic (operation 406).

Subsequently, the device can receive an acknowledgment from the peer participating device indicating that egress blocking is disabled (operation 408). The device can then enable ISL redirect to the peer participating device (operation 410) and disable the local communication for the MCLAG (operation 412). The device can check whether all MCLAGs are ready for the event (operation 414). If all MCLAGs are not ready, the device can continue to enable flood blocking for the forwarding multi-destination traffic via another MCLAG (operation 404). On the other hand, if all MCLAGs are ready, the device can commence the controlled unavailability event (operation 416).

Figure 4B:
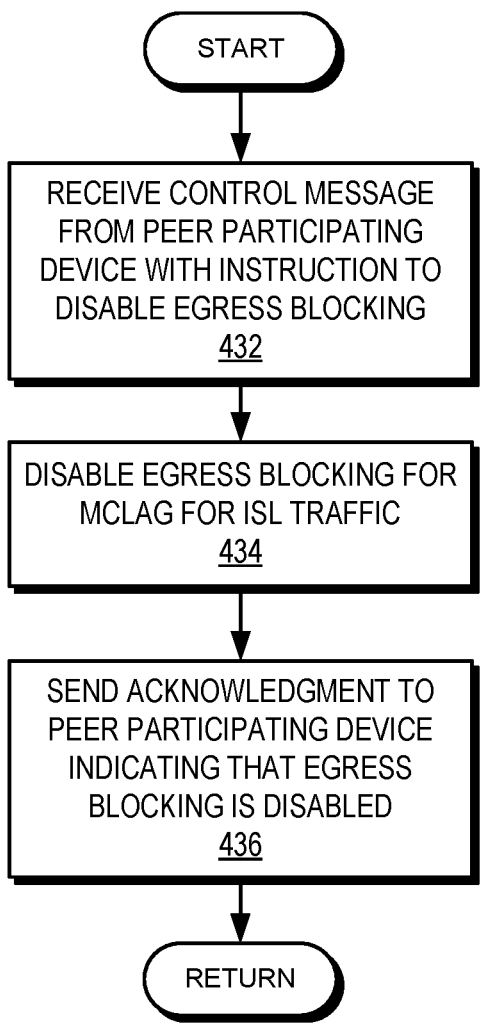
FIG. 4B presents a flowchart illustrating the process of a participating device of an MCLAG locally applying a configuration that efficiently redirects traffic from a remote participating device, in accordance with an aspect of the present application.

FIG. 4B presents a flowchart illustrating the process of a participating device of an MCLAG locally applying a configuration that efficiently redirects traffic from a remote participating device, in accordance with an aspect of the present application. The operations of this process can be performed by one or more daemons and the forwarding hardware of the device. During operation, the device can receive a control message from a peer participating device with an instruction to disable egress blocking (operation 432). The device can then disable egress blocking for the MCLAG for ISL traffic (operation 434). Subsequently, the device can send an acknowledgment to the peer participating device indicating that the egress blocking is disabled (operation 436).

Figure 4C:
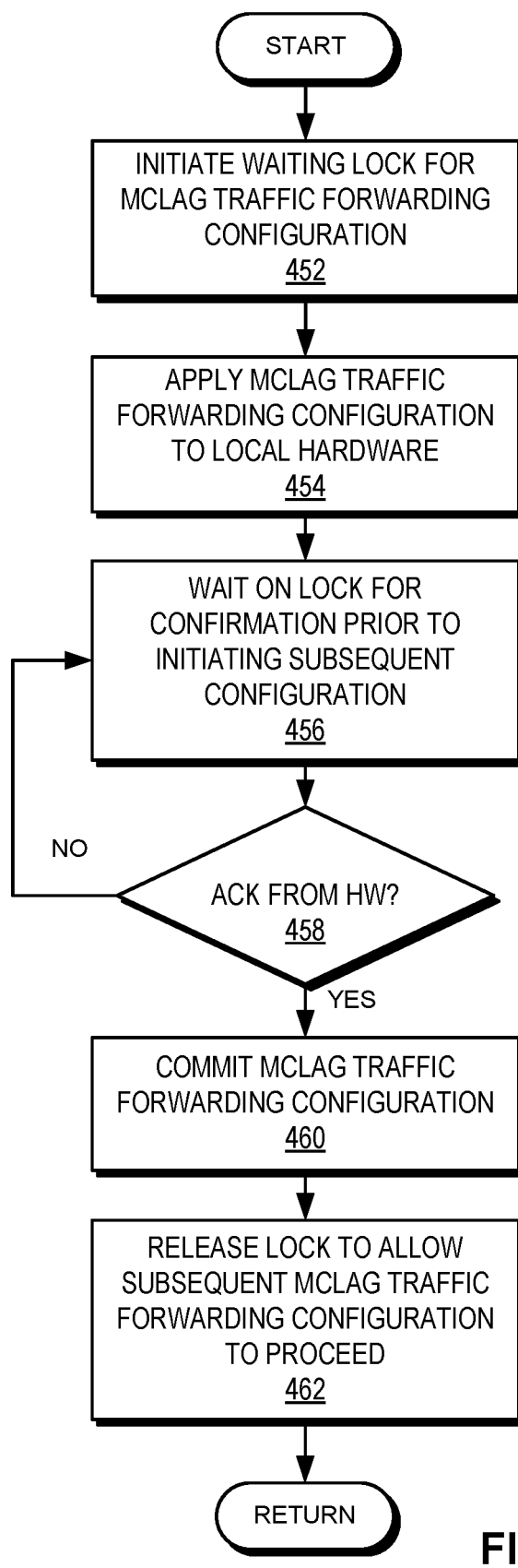
FIG. 4C presents a flowchart illustrating the process of a participating device of an MCLAG applying a respective configuration for efficiently redirecting traffic from the device, in accordance with an aspect of the present application.

FIG. 4C presents a flowchart illustrating the process of a daemon of a participating device of an MCLAG applying a respective configuration for efficiently redirecting traffic from the device, in accordance with an aspect of the present application. During operation, the daemon can initiate a waiting lock for an MCLAG traffic forwarding configuration (operation 452). The waiting lock can be a conditional waiting process until the condition is satisfied. The daemon can then apply the MCLAG traffic forwarding configuration to the local hardware (operation 454) and wait on the lock for confirmation prior to initiating a subsequent configuration (operation 456).

The daemon can check whether an acknowledgment from the hardware is received (operation 458). If an acknowledgment is not received, the daemon can continue to wait on the lock (operation 460). On the other hand, if an acknowledgment is received, the daemon can commit the MCLAG traffic forwarding configuration (operation 460). The daemon can then release the lock to allow a subsequent MCLAG traffic forwarding configuration to proceed (operation 462). The daemon can apply this process to apply a respective configuration of the sequence.

Figure 5A:
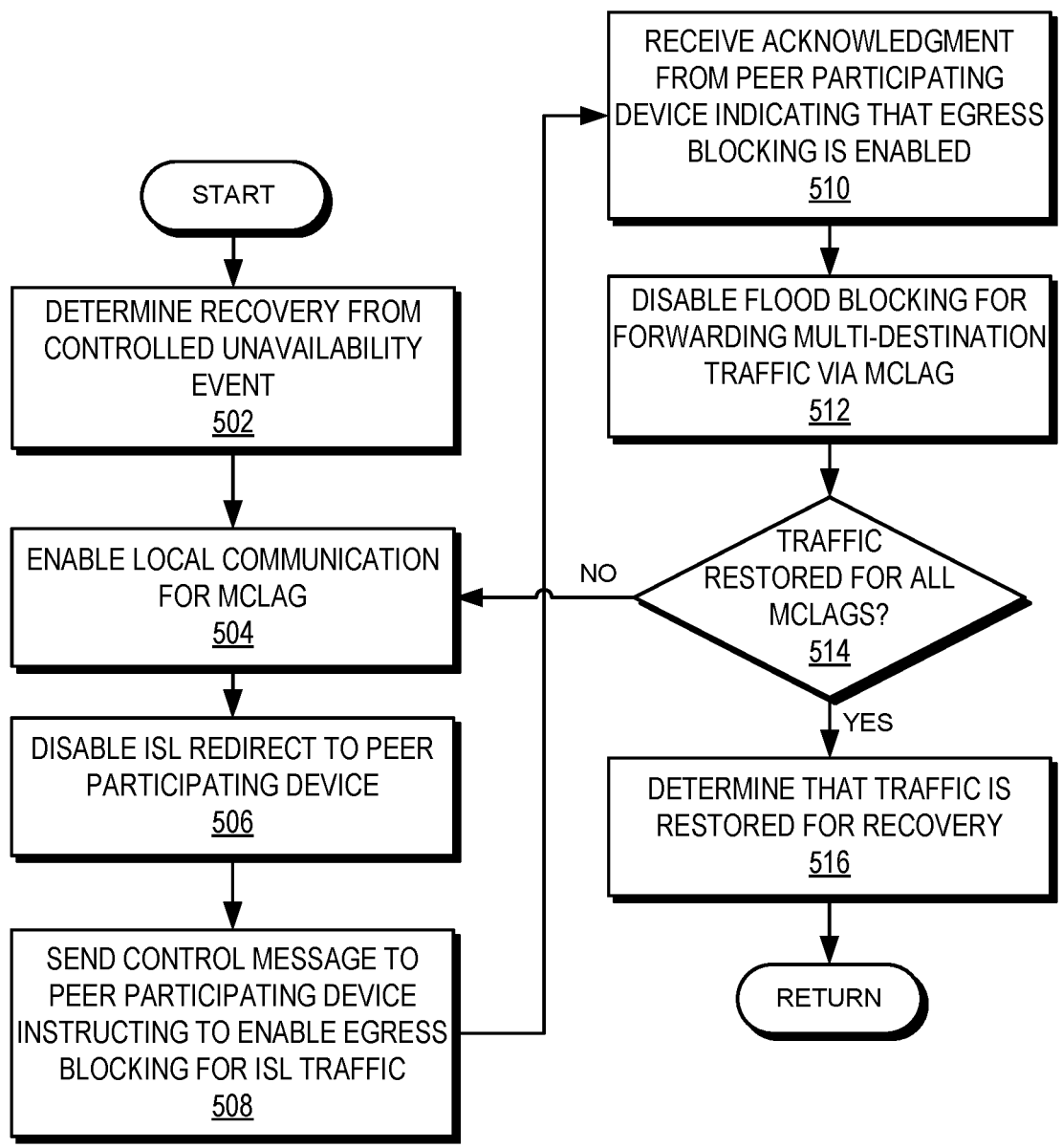
FIG. 5A presents a flowchart illustrating the process of a participating device of an MCLAG applying sequential configurations that efficiently reestablish traffic to the device, in accordance with an aspect of the present application.

FIG. 5A presents a flowchart illustrating the process of a participating device of an MCLAG applying sequential configurations that efficiently reestablish traffic to the device, in accordance with an aspect of the present application. The operations of this process can be performed by one or more daemons and the forwarding hardware of the device. During operation, the device can determine the recovery from a controlled unavailability event (operation 502). The device can then enable the local communication for the MCLAG (operation 504) and disable ISL redirect to the peer participating device (operation 506).

The device can send a control message to a peer participating device instructing to enable egress blocking for ISL traffic (operation 508). Subsequently, the device can receive an acknowledgment from the peer participating device indicating that egress blocking is enabled (operation 510). The device can then disable flood blocking for the forwarding multi-destination traffic via the MCLAG (operation 512). The device can check whether the traffic is restored for all MCLAGs (operation 514). If the traffic is not restored for all MCLAGs, the device can continue to enable local communication for another MCLAG (operation 504). On the other hand, if the traffic is restored for all MCLAGs, the device can determine that the traffic is restored for the recovery (operation 516).

Figure 5B:
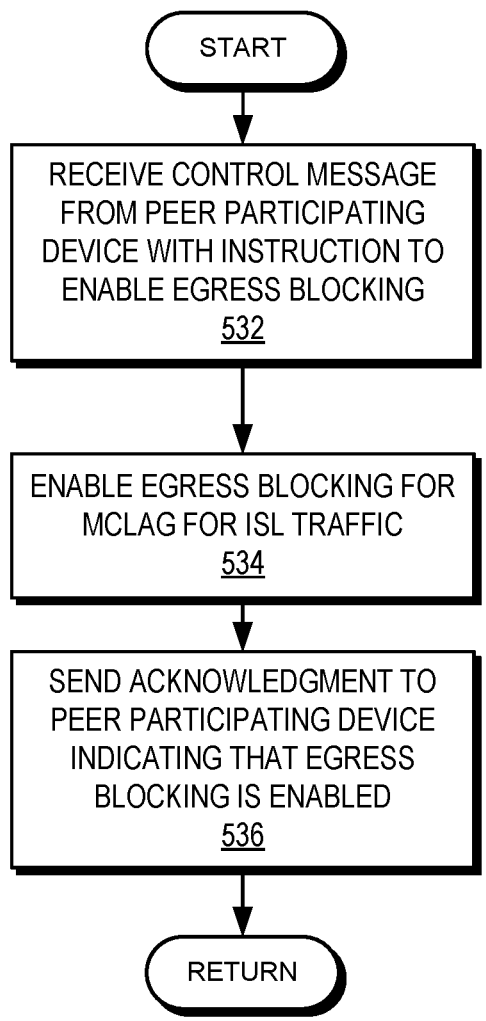
FIG. 5B presents a flowchart illustrating the process of a participating device of an MCLAG locally applying a configuration that efficiently reestablishes traffic to a remote participating device, in accordance with an aspect of the present application.

FIG. 5B presents a flowchart illustrating the process of a participating device of an MCLAG locally applying a configuration that efficiently reestablishes traffic to a remote participating device, in accordance with an aspect of the present application. The operations of this process can be performed by one or more daemons and the forwarding hardware of the device. During operation, the device can receive a control message from a peer participating device with an instruction to enable egress blocking (operation 532). The device can then enable egress blocking for the MCLAG for ISL traffic (operation 534). Subsequently, the device can send an acknowledgment to the peer participating device indicating that the egress blocking is enabled (operation 536).

Figure 6:
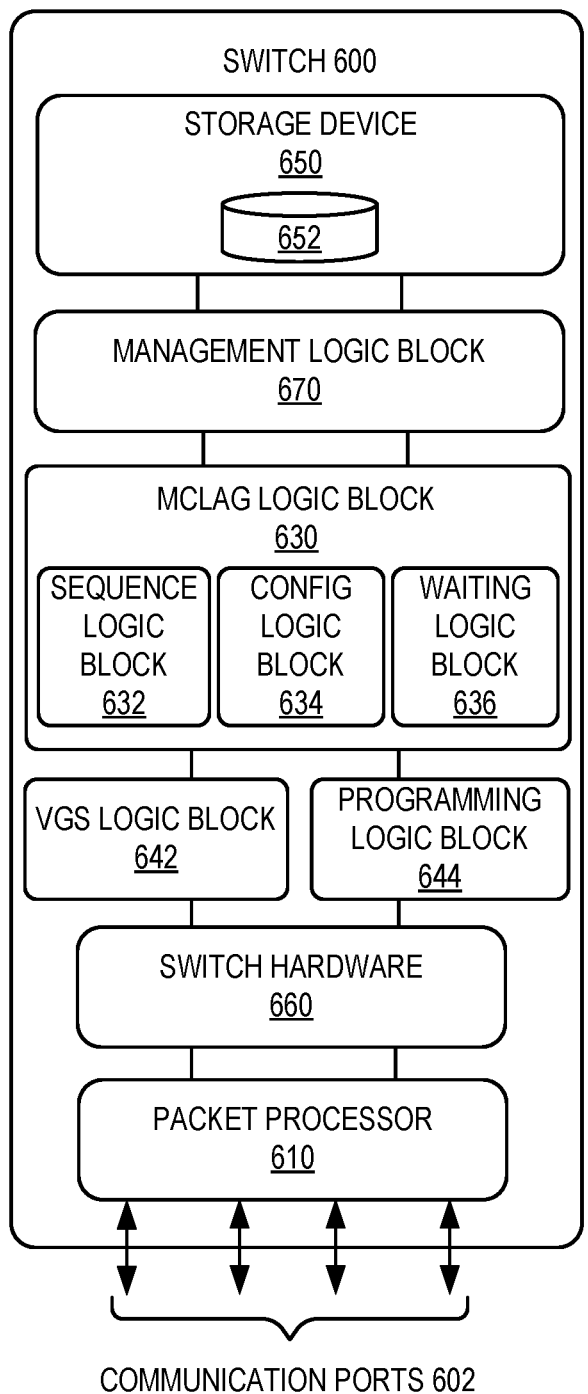
FIG. 6 illustrates an example of a switch supporting efficient traffic redirection for MCLAGs for controlled unavailability events, in accordance with an embodiment of the present application.

FIG. 6 illustrates an example of a switch supporting efficient traffic redirection for MCLAGs for controlled unavailability events, in accordance with an embodiment of the present application. In this example, a switch 600 includes a number of communication ports 602, a packet processor 610, and a storage device 650. Switch 600 can also include switch hardware 660 (e.g., processing hardware of switch 600, such as its application-specific integrated circuit (ASIC) chips), which includes information based on which switch 600 processes packets (e.g., determines output ports for packets). Packet processor 610 extracts and processes header information from the received packets. Packet processor 610 can identify a switch identifier (e.g., a MAC address and/or an IP address) associated with switch 600 in the header of a packet.

Communication ports 602 can include inter-switch communication channels for communication with other switches and/or user devices. The communication channels can be implemented via a regular communication port and based on any open or proprietary format. Communication ports 602 can include one or more Ethernet ports capable of receiving frames encapsulated in an Ethernet header. Communication ports 602 can also include one or more IP ports capable of receiving IP packets. An IP port is capable of receiving an IP packet and can be configured with an IP address. Packet processor 610 can process Ethernet frames and/or IP packets. A respective port of communication ports 602 may operate as an ingress port and/or an egress port.

Switch 600 can maintain a database 652 (e.g., in storage device 650). Database 652 can be a relational database and may run on one or more DBMS instances. Database 652 can store information associated with a sequence of configurations facilitating efficient and graceful traffic redirection from switch 600. For example, the information can include configuration commands and parameters associated with a respective configuration and the sequence of the configurations.

Switch 600 can include a VGS logic block 642 and a programming logic block 644. VGS logic block 642 can allow switch 600 to operate as a VGS, such as VGS 106 of FIG. 1A, in a network. To do so, VGS logic block 642 may operate in conjunction with another switch. Programming logic block 644 can receive a request for programming a configuration and instruct hardware 660 to apply the configuration. Programming logic block 644 can also provide acknowledgment when the configuration is complete at hardware 660. Switch 600 can also include a management logic block 670 that can manage the controlled (or predetermined) unavailability for switch 600. For example, management logic block 670 can perform one or more operations that can trigger controlled unavailability.

Switch 600 can include an MCLAG logic block 630, which can include a sequence logic block 632, a configuration logic block 634, and a waiting logic block 636. MCLAG logic block 630 can allow switch 600 to operate as a participating device (e.g., using one or more ports of communication ports 602) in one or more MCLAGs. Sequence logic block 632 can determine the initiation of and recovery from a controlled unavailability event for switch 600. Sequence logic block 632 can also determine respective sequences of configurations for the initiation of and recovery from the controlled unavailability event.

Configuration logic block 634 can apply a respective configuration of a sequence for a respective MCLAG. To do so, configuration logic block 634 can request programming logic block 644 to program the configuration on hardware 660. Configuration logic block 634 can also instruct a peer participating device of the MCLAG to apply a configuration. Waiting logic block 636 can wait for an acknowledgment from programming logic block 644 for a respective configuration, thereby ensuring that configuration logic block 634 can proceed to a subsequent configuration of the sequence when the current configuration is complete. Similarly, waiting logic block 636 can wait for an acknowledgment from a peer participating device if the configuration is directed to the peer participating device.

The data structures and code described in this detailed description are typically stored on a computer-readable storage medium, which may be any device or medium that can store code and/or data for use by a computer system. The computer-readable storage medium includes, but is not limited to, flip/flops, latches, registers, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of examples of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method, comprising:
    participating in a multi-chassis link aggregation group (MCLAG) using a first interface of a first switch of a network, wherein the MCLAG includes the first interface of the first switch and a second interface of a second switch;
    based on a predetermined unavailability for the first switch, determining a sequence of applications for a plurality of traffic forwarding configurations that facilitate loop prevention in the network via the MCLAG, wherein a first subset of the plurality of traffic forwarding configurations is applicable to the first switch and a second subset of the plurality of traffic forwarding configurations is applicable to the second switch, wherein the first subset of the plurality of traffic forwarding configurations comprises blocking flooding of multi-destination traffic over the MCLAG, redirecting traffic destined to the MCLAG to the second switch, and disabling local communication for the MCLAG, and wherein the second subset of the plurality of traffic forwarding configuration comprises forwarding of the redirected traffic from the second switch over the MCLAG;
    applying the first subset of the plurality of traffic forwarding configurations to the first switch in an order indicated by the sequence of applications to redirect unicast traffic from the first switch to the second switch prior to the predetermined unavailability for the first switch while forwarding traffic via the MCLAG, wherein applying a respective traffic forwarding configuration comprises programming corresponding switch hardware with the traffic forwarding configuration;
    determining, based on a message from the second switch, that the second subset of the plurality of traffic forwarding configurations is applied to the second switch; and
    in response to the first subset and the second subset of the plurality of traffic forwarding configurations being applied on the first and second switches, respectively, performing a set of operations on the first switch that triggers the predetermined unavailability.

2. The method of claim 1, wherein, in response to a recovery from the predetermined unavailability, the method further comprises:
    determining a second sequence of applications for the plurality of traffic forwarding configurations; and
    applying the first subset of the plurality of traffic forwarding configurations to the first switch in the order indicated by the second sequence of applications to restore traffic for the MCLAG.

3. The method of claim 2, wherein the second sequence of applications is a reverse of the sequence of applications.

4. The method of claim 1, wherein the MCLAG is one of a plurality of MCLAGs configured on the first and second switches;
    wherein the method further comprises applying the first subset of the plurality of traffic forwarding configurations to the first switch for a respective MCLAG of the plurality of MCLAGs.

5. The method of claim 4, further comprising performing the set of operations on the first switch in response to applying the plurality of traffic forwarding configurations to the plurality of MCLAGs.

6. The method of claim 1, wherein configuring the corresponding switch hardware with the traffic forwarding configuration in the order indicated by the sequence of applications comprises:
    receiving an acknowledgment indicating that the traffic forwarding configuration is programmed at the corresponding switch hardware; and proceeding to application of a subsequent traffic forwarding configuration, if any, in the sequence of applications in response to receiving the acknowledgment.

7. The method of claim 1, wherein the method further comprises:
requesting, based on the sequence of applications, the second switch to apply the second subset of the plurality of traffic forwarding configuration prior to the predetermined unavailability; and
receiving the message, which comprises an acknowledgment indicating that the second subset of the plurality of traffic forwarding configuration is programmed at switch hardware of the second switch.

8. The method of claim 1, wherein the sequence of applications is based on inter-dependencies of the plurality of traffic forwarding configurations such that traffic redirection is enabled at the corresponding switch hardware prior to disabling a local instance of the MCLAG.

9. The method of claim 1, further comprising sending, from the first switch, a notification message to a third switch of the network prior to the predetermined unavailability, wherein the notification message indicates unavailability of a link of the first switch in the MCLAG for allowing the third switch to withdraw the link from a load balancing process associated with the MCLAG.

10. A non-transitory computer-readable storage medium storing instructions that when executed by a computing system cause the computing system to perform a method, the method comprising:
participating in a multi-chassis link aggregation group (MCLAG) using a first interface of a first switch of a network, wherein the MCLAG includes the first interface of the first switch and a second interface of a second switch;
based on a predetermined unavailability for the first switch, determining a sequence of applications for a plurality of traffic forwarding configurations that facilitate loop prevention in the network via the MCLAG, wherein a first subset of the plurality of traffic forwarding configurations is applicable to the first switch and a second subset of the plurality of traffic forwarding configurations is applicable to the second switch, wherein the first subset of the plurality of traffic forwarding configurations comprises blocking flooding of multi-destination traffic over the MCLAG, redirecting traffic destined to the MCLAG to the second switch, and disabling local communication for the MCLAG, and wherein the second subset of the plurality of traffic forwarding configuration comprises forwarding of the redirected traffic from the second switch over the MCLAG;
applying the first subset of the plurality of traffic forwarding configurations to the first switch in an order indicated by the sequence of applications to redirect unicast traffic from the first switch to the second switch prior to the predetermined unavailability for the first switch while forwarding traffic via the MCLAG, wherein applying a respective traffic forwarding configuration comprises programming corresponding switch hardware with the traffic forwarding configuration;
determining, based on a message from the second switch, that the second subset of the plurality of traffic forwarding configurations is applied to the second switch; and
in response to the first subset and the second subset of the plurality of traffic forwarding configurations being applied on the first and second switches, respectively, performing a set of operations on the first switch that triggers the predetermined unavailability.

11. The non-transitory computer-readable storage medium of claim 10, wherein, in response to a recovery from the predetermined unavailability, the method further comprises:
determining a second sequence of applications for the plurality of traffic forwarding configurations; and
applying the first subset of the plurality of traffic forwarding configurations to the first switch in the order indicated by the second sequence of applications to restore traffic for the MCLAG.

12. The non-transitory computer-readable storage medium of claim 10, wherein the MCLAG is one of a plurality of MCLAGs configured on the first and second switches;
wherein the method further comprises applying the first subset of the plurality of traffic forwarding configurations to the first switch for a respective MCLAG of the plurality of MCLAGs.

13. The non-transitory computer-readable storage medium of claim 12, wherein the method further comprises performing the set of operations on the first switch in response to applying the plurality of traffic forwarding configurations to the plurality of MCLAGs.

14. The non-transitory computer-readable storage medium of claim 10, wherein configuring the corresponding switch hardware with the traffic forwarding configuration in the order indicated by the sequence of applications comprises:
receiving an acknowledgment indicating that the traffic forwarding configuration is programmed at the corresponding switch hardware; and
proceeding to application of a subsequent traffic forwarding configuration, if any, in the sequence of applications in response to receiving the acknowledgment.

15. The non-transitory computer-readable storage medium of claim 10, wherein the sequence of applications further includes an external traffic forwarding configuration applicable to the second switch, and wherein the method further comprises:
requesting, based on the sequence of applications, the second switch to apply the second subset of the plurality of traffic forwarding configuration prior to the predetermined unavailability; and
receiving the message, which comprises an acknowledgment indicating that the second subset of the plurality of traffic forwarding configuration is programmed at switch hardware of the second switch.

16. The non-transitory computer-readable storage medium of claim 10, wherein the sequence of applications is based on inter-dependencies of the plurality of traffic forwarding configurations such that traffic redirection is enabled at the corresponding switch hardware prior to disabling a local instance of the MCLAG.

17. The non-transitory computer-readable storage medium of claim 10, wherein the method further comprises sending, from the first switch, a notification message to a third switch of the network prior to the predetermined unavailability, wherein the notification message indicates unavailability of a link of the first switch in the MCLAG for allowing the third switch to withdraw the link from a load balancing process associated with the MCLAG.

18. A computer system, comprising:
processing circuitry;
forwarding hardware;
a network interface card comprising a first interface; and a non-transitory computer-readable storage medium storing instructions that when executed by the processing resource cause the computer system to:

participate in a multi-chassis link aggregation group (MCLAG) in a network using the first interface, wherein the MCLAG includes the first interface and a second interface of a second computer system;

determine, based on a predetermined unavailability for the computer system, a sequence of applications for a plurality of traffic forwarding configurations that facilitate loop prevention in the network via the MCLAG, wherein a first subset of the plurality of traffic forwarding configurations is applicable to the computer system and a second subset of the plurality of traffic forwarding configurations is applicable to the second computer system, wherein the first subset of the plurality of traffic forwarding configurations comprises blocking flooding of multi-destination traffic over the MCLAG, redirecting traffic destined to the MCLAG to the second switch, and disabling local communication for the MCLAG, and wherein the second subset of the plurality of traffic forwarding configuration comprises forwarding of the redirected traffic from the second switch over the MCLAG;

apply the first subset of the plurality of traffic forwarding configurations to the computer system in an order indicated by the sequence of applications to redirect unicast traffic from the computer system to the second computer system prior to the predetermined unavailability for the computer system while forwarding traffic via the MCLAG, wherein applying a respective traffic forwarding configuration comprises programming the forwarding hardware with the traffic forwarding configuration;

determine, based on a message from the second computer system, that the second subset of the plurality of traffic forwarding configurations is applied to the second computer system; and in response to the plurality of the first subset and the second subset of traffic forwarding configurations being applied on the first and second switches, respectively, perform a set of operations on the computer system that triggers the predetermined unavailability.

* * * * *